United States Patent
Gerhard et al.

(10) Patent No.: US 8,446,411 B2
(45) Date of Patent: May 21, 2013

(54) ADAPTIVE IMAGE RENDERING AND USE OF IMPOSTER

(75) Inventors: Lutz Gerhard, Seattle, WA (US); Benjamin Vanik, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 418 days.

(21) Appl. No.: 12/814,418

(22) Filed: Jun. 11, 2010

(65) Prior Publication Data
US 2011/0304625 A1 Dec. 15, 2011

(51) Int. Cl.
*G06T 17/00* (2006.01)
*G09G 5/00* (2006.01)

(52) U.S. Cl.
USPC .......................................... 345/428; 345/619

(58) Field of Classification Search
None
See application file for complete search history.

(56) References Cited

U.S. PATENT DOCUMENTS

| | | | |
|---|---|---|---|
| 7,554,539 | B2 | 6/2009 | Balfour |
| 2002/0112001 | A1 | 8/2002 | Sutherland et al. |
| 2004/0047519 | A1 | 3/2004 | Gennart et al. |
| 2006/0224993 | A1 | 10/2006 | Wong et al. |
| 2007/0223068 | A1* | 9/2007 | Ishii et al. ............. 358/527 |
| 2008/0144968 | A1 | 6/2008 | Cohen et al. |
| 2009/0041375 | A1 | 2/2009 | Cohen et al. |
| 2010/0064002 | A1 | 3/2010 | Levanon et al. |
| 2010/0217934 | A1* | 8/2010 | Martin ..................... 711/118 |

FOREIGN PATENT DOCUMENTS

| | | |
|---|---|---|
| KR | 1020010113670 A | 12/2001 |
| KR | 1020060103461 A | 9/2006 |
| KR | 1020100052178 A | 5/2010 |

OTHER PUBLICATIONS

M. Mikherjee and G. Sharma, A Multiresolution Halftoning Algorithm for Progressive Display, Proc. of SPIE-IS&T Electronic Imaging, SPIE vol. 5667, 2005, pp. 525-533.*

Lin, et al., "Fast browsing of Large-scale Images using Server Prefetching and Client Caching Techniques", Retrieved at << http://citeseerx.ist.psu.edu/viewdoc/download?doi=10.1.1.44.1692&rep=rep1&type=pdf >>, In SPIE proceedings series, Applications of digital image processing XXII, Oct. 1999, 12 pages.

(Continued)

*Primary Examiner* — Kee M Tung
*Assistant Examiner* — Haixia Du

(57) ABSTRACT

Images and/or collections of images may be rendered in a way that adapts to ambient circumstances, and that may enhance a user's perception of experience quality. When an image is requested for display, it is determined whether a rendered version of the image exists. If no rendered version of the image exists, then an imposter image is displayed. The imposter image may include arbitrary colors and/or patterns. If an appropriate rendered version of the image exists, then the rendered version may be displayed in place of the imposter version. While the imposter or rendered image is being displayed, the image may be retrieved, and may be rendered at other resolutions (e.g., successively higher resolutions). The choice of resolutions may be adapted to available transmission bandwidth, display speed, or other considerations.

14 Claims, 7 Drawing Sheets

OTHER PUBLICATIONS

Funkhouser, et al., "Adaptive Display Algorithm for Interactive Frame Rates during Visualization of Complex Virtual Environments", Retrieved at << http://reference.kfupm.edu.sa/content/a/d/adaptive_display_algorithm_for_interacti_41512.pdf >>, International Conference on Computer Graphics and Interactive Techniques, Proceedings of the 20th annual conference on Computer graphics and interactive techniques, Aug. 2-6, 1993, 8 pages.

"International Search Report and Written Opinion of the International Searching Authority", Mailed Date: Dec. 28, 2011, Application No. PCT/US2011/038008, Filed Date: May 25, 2011, 10 pages.

* cited by examiner

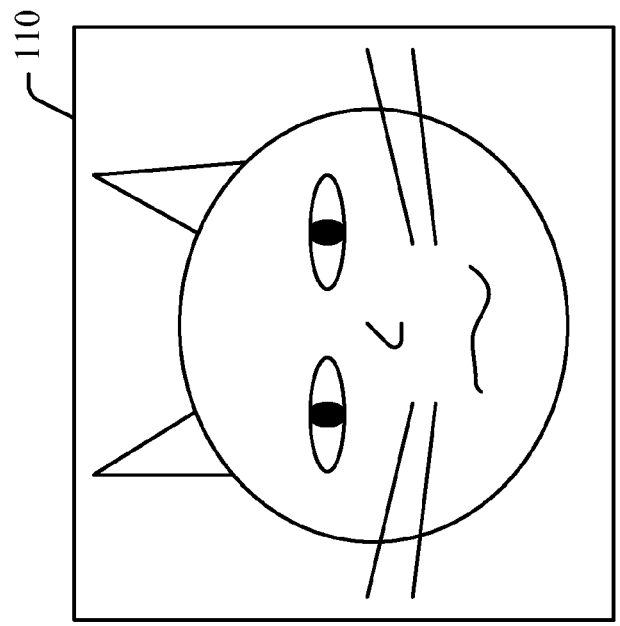
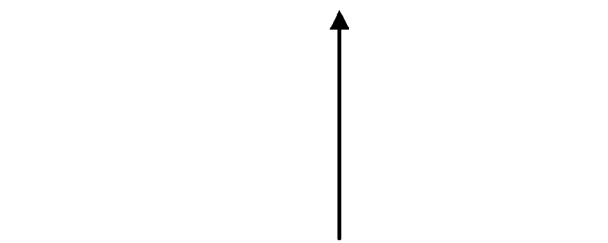
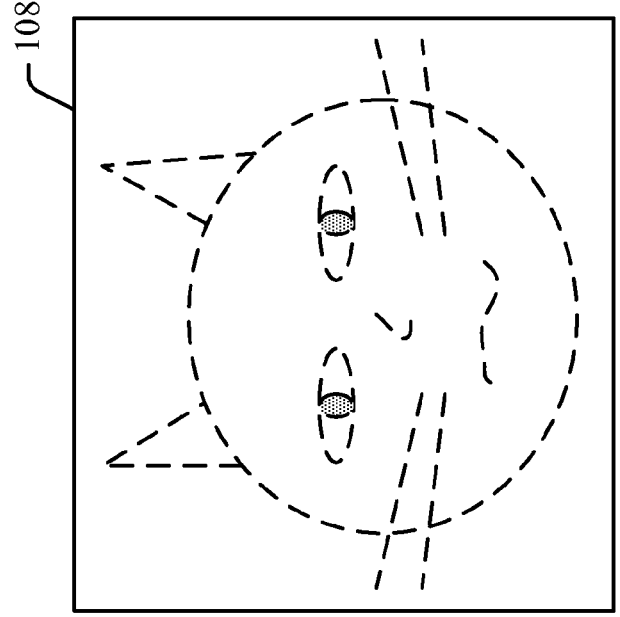
FIG. 2

ADAPTIVE IMAGE RENDERING AND USE OF IMPOSTER

BACKGROUND

Images are rendered from an underlying content source. Many content sources allow images to be rendered at a wide variety of resolutions, or at arbitrarily high resolutions. However, placing an image on screen can take a long time, either because rendering the image is computationally intense, or because, due to input/output (I/O) response time, it may take a long time to download an image from the network or slower local storage device. Thus, rendering can take a considerable amount of time. In many cases, the image content that is to be displayed is actually a collection of images (e.g., a set of many images that are responsive to an image search). Since each image in the collection has its own source that has to be rendered separately, the time involved in rendering a collection of images is multiplied many-fold as compared with rendering a single image.

From the perspective of providing a high quality user experience, there are, in general, two ways of addressing the time it takes to render an image. One way is to pre-render the images before they are requested. This approach involves anticipating what images will be requested, and at what resolutions. It also involves storing a large number of pre-rendered images, and devoting computational resources to rendering images that may or may not be requested at some point in the future. Moreover, if the pre-rendered images are high-resolution, then—although the delay in rendering the image is avoided—a delay could still result from the amount of time that it takes to transmit a high resolution image. When a collection of high resolution images is involved, then again this delay may be increased many-fold.

Another way to address the time it takes to render the image is to render the image on demand, and to tell the user that he or she will have to wait while the image is being rendered. When this technique is used, the user might be shown a message telling him or her to wait while the image is rendered, or might be shown a symbol or animation (e.g., sands falling through an hourglass, hands moving on a clock, etc.) while the image is rendered. This technique generally results in a low-quality user experience.

Some systems use a limited form of pre-rendering. For example, images might be stored in two forms: a high resolution image that involves a large amount of data, and a small thumbnail image at a very low resolution. A drawback of this approach is that it forces a display system to make a choice between showing a low resolution thumbnail, or showing a high resolution image that takes can take a long time to transmit or to draw on a display.

SUMMARY

Images may be rendered in a way that takes into account the availability of existing pre-rendered images and the speed at which images can be transmitted and/or drawn, and that also enhances the user experience even in the case where no pre-rendered images are available.

When an image is to be displayed, an image rendering system attempts to determine whether a pre-rendered image is locally available on the machine that is doing the rendering. If so, that image may be presented. If no appropriate pre-rendered image is available, then the system draws a placeholder image called an "imposter." The imposter might, for example, be a blur of colors. The appearance of the imposter may suggest to a user that the imposter is the first iteration of an image that will be brought into clarity at increasingly high resolutions. However, the imposter might not be based on any actual information from the underlying image. Thus, the inference that the imposter represents an early stage in drawing a higher-resolution image is merely an illusion—but one that enhances the user experience. When a collection of images is to be rendered (e.g., a set of images that is responsive to an image search), each image that is not available in a pre-rendered form may be shown as an imposter image.

Once something has been drawn in the place designated for the image (whether the item that is drawn is an imposter or a low-resolution version of the real image), the process of obtaining a real image or a higher-resolution version of the image may proceed. Assuming that a suitable pre-rendered image is not available locally, an image source (i.e., data containing the underlying model of the image to be rendered, such as a JPEG file) may be retrieved. The image may then be rendered at a higher resolution. Where applicable, several images may be rendered to be included in a collection, in which case the processes of retrieving and rendering the separate images that are part of the collection may take place in parallel. One variation on the idea of rendering a higher resolution image to replace a low-resolution image or imposter is to render and draw successively higher resolution images, thereby animating the process of bringing an image into greater focus. When an imposter image is used, the successive images may blend increasing amounts of real image data with the imposter data.

The way in which images are rendered and drawn may be adaptive so as to take into account the availability and capability of various resources. For example, the nature of some image formats provides fast paths to rendering certain resolutions (e.g., images can be quickly rendered at resolutions of 256 or 512 pixels from a JPEG), so the availability of an image in a particular format might be used as a basis to choose a particular resolution. Moreover, the speed at which images can be drawn and/or transmitted might be used as a basis to choose how many different resolutions of an image are to be drawn. For example, one might want to animate an image coming into focus by showing, e.g., thirty successively-higher resolutions over the course of one second. But if the physical capabilities of the environment do not allow images to be drawn and/or transmitted at thirty frames per second, then the system could make a different choice about the resolutions at which it will render the image. Conversely, the environment might allow images to be drawn and/or transmitted at a high speed, but the rendering of those images may be slow. In other words, considerations about the slowness of the drawing process and the slowness of the rendering process may be taken into account separately when determining what images are to be rendered.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 1 and 2 are block diagrams showing an example of how an image may be rendered at successively higher resolutions.

DETAILED DESCRIPTION

Figure 1:
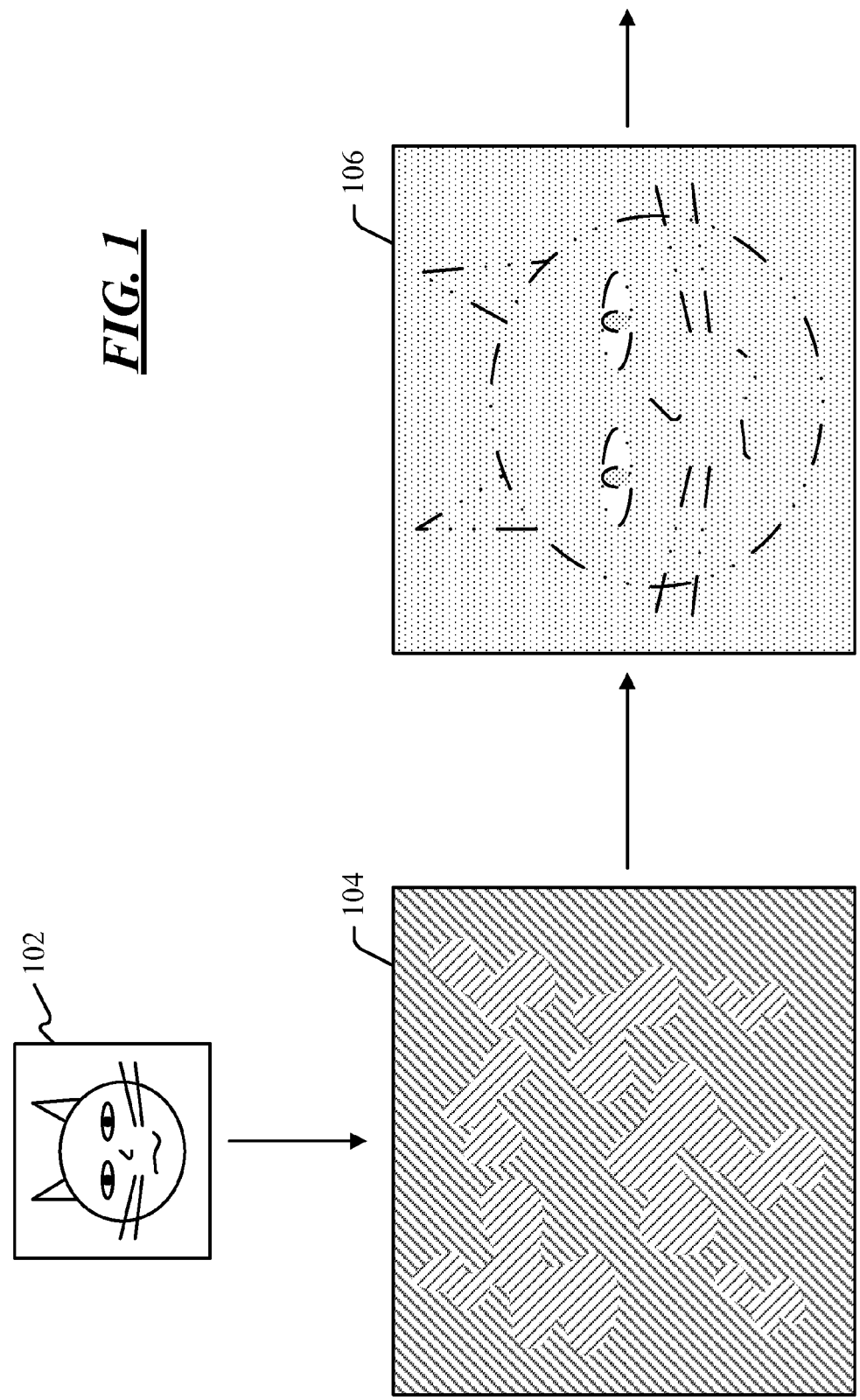

Image content has become much more prevalent in computing in recent years. In the early days of computing, interaction between humans and computers generally happened in the form of text communication. At present, users have come to expect content in the form of images, and have increasingly high expectations of both the quality of the images, and the quality of the experience in delivering those images. E-mails, search results, web pages, etc., commonly contain images, and users expect these images to be delivered over various types of wired or wireless connections, and on many kinds of devices ranging from desktop computers to wireless telephones.

In many cases, images are stored in some kind of model which cannot be displayed directly. Rather, the image has to be rendered into pixels at some resolution, so that the pixels can be displayed on a display device. The process of rendering an image, particularly a high resolution image, is expensive in terms of the amount of computation that it takes to produce the image, or the amount of time it takes to perform I/O operations on the image. The amount of time it takes to handle such an image degrades the user experience in receiving those images. In many cases, the images to be rendered are part of a collection (e.g., a collection of images that make up the search results for an image search), so the cost of rendering a collection may be many-fold higher than the cost of rendering a single image.

When it comes to providing a high-quality user experience, there are many ways to address the problem of providing rendered images. One way is to pre-render the images, so that the images will be ready to display in response to user demand. Pre-rendering images has a cost, however, since it involves devoting large amounts of computational resources and storage to creating images that may or may not ever be requested. Images can be requested at various resolutions, which means that pre-rendering the images may involve not only anticipating which images are going to be requested, but also at what resolution those images will be requested. Moreover, since the set of available images is constantly changing, pre-rendering of images is an ongoing process that has to be carried out for each new image that could be requested.

Additionally, while pre-rendering reduces (effectively to zero) the amount of time that one will have to wait to render an image after the image is requested, pre-rendering can impose other types of time costs. Since it may be feasible to render an image only at a small number of different resolutions (e.g., low, medium, and high), a pre-rendered high-quality image may not be compatible with the amount of available transmission bandwidth or the drawing speed of the device on which the image is to be displayed. For example, if images are available at medium and high resolution, to optimize the user experience (in terms of the tradeoff of response time and quality), it might make sense to show an image that is somewhere between medium and high resolution. But if no such image exists, then a system would have to choose between providing the medium resolution image and providing the high resolution image. The former choice may degrade the user experience by providing lower visual quality, while the latter may degrade the user experience in terms of the amount of time that it takes to transmit the image to the user's device or the amount of time it takes to draw it on the display. While the subject matter herein applies both the case where a single image is to be rendered and in the case where a collection of images are to be rendered, it is noted that the problems of rendering high quality images quickly increases multi-fold when a collection of images is to be rendered as compared to a single image.

The subject matter described herein allows images to be rendered in a manner that adapts to the various constraints on providing images, in order to provide a high quality overall user experience. Some examples of constraints that may exist on the ability to provide images include: the availability (or lack thereof) of pre-rendered images; the relative ease of rendering images at certain resolutions as compared with others; the availability of bandwidth to transmit the images from the renderer to the device on which they will be displayed; and the speed at which the display device can draw successive images. Moreover, through the use of imposter images, the subject matter herein can enhance the user's perception of the experience of receiving images even when no pre-rendered image (not even a low-resolution image) is readily available.

When a request for one or more images is made, a system designed in accordance with the subject matter herein attempts to determine what it can provide quickly. The request for images may take the form of a direct user request. Or, as another example, a search engine may request the images as part the process of responding to an image search request. Or as a further example, the images may be referenced on a web page, and the web browser may request the images as part of processing the web page. The subject matter herein is not limited to any particular way in which the request for an image arises. There may be low-resolution pre-rendered images available, in which case those images may be provided. Low-resolution images can be transmitted and drawn quickly, so using low-resolution images may make the response to the request appear to be very fast. However, if low-resolution images are not available, the system may provide an imposter image. An imposter image is an image that may appear, to a user, to be a very early stage in the process of drawing the image at increasingly high resolutions. However, the imposter image might be based on nothing more than the size and aspect ratio of the image. For example, an imposter image might be simply a blur of colors and patterns shown in the shape and size of the drawing that will be rendered later. But since the imposter image might be based on little or no information about the drawing, it can be provided very quickly, thereby providing some content that can be used to respond to the image request. This quick response may enhance the user's perception of the experience.

While the user is being shown an imposter image or a low-resolution image, the system may work on obtaining images at other resolutions. There are various tasks that may be involved in producing these images. First, the underlying un-rendered image may have to be located from a local or remote source. Once this image is located, various decisions may be made about how to render the image. For example, the system may want to animate the process of drawing the image at a higher resolution, by showing successively higher resolution renderings of the image. The rate at which this animation can be done may depend on the rate at which images can be transmitted, the rate at which the images can be drawn on the screen, the number of different renderings of the image that can be done per unit time, and—in the case of an image collection—the number of images that are included in the collection. Thus, the system might want to animate the process of bringing an image into focus by doubling the resolution for successive images. But if rendering a new image for each resolution for each successive power of two would involve rendering more images than the computational resources of the system can handle in a given unit of time, or more transmission and/or redrawing of an image than the communication and/or display technology can handle per unit of time, then the system might choose to render successive images such that each image has quadruple the resolution of the previous one. Or, in certain image formats (e.g., JPEG), some resolutions can be rendered faster than others, so the system might choose to render an image at a resolution that can be rendered quickly even if—all other things being equal—the system would have chosen a different resolution.

In general, the subject matter described herein may be used to show any number of images, including a single image. However, in one example, the system may be used to render a collection of images, such as a plurality of images that are being provided to a user in response to an image search query.

Turning now to the drawings, FIGS. 1 and 2 show an example of how an image may be rendered at successively higher resolutions. In FIG. 1, image 102 has been requested. Image 102 could be in some format, such as a Joint Photographic Experts Group (JPEG) file, a Tagged Image File Format (TIFF) file, a format that represents shapes geometrically (e.g., a file generated by the VISIO drawing program), or could be any other type of image. The request for image 102 may arise in any manner. For example, a user may make an explicit request for image 102, or image 102 may be referenced in a web page that a browser is trying to load, or image 102 may be returned by a search engine as being responsive to a search query. The foregoing are some examples of how a request for an image may arise, but a request for image 102 could arise in any manner.

In the example of FIGS. 1 and 2, it may be the case that no pre-rendered version of image 102 is available. Thus, an imposter image 104 may be shown. In the example of FIG. 1, as a black-and-white blur of diagonal lines that are drawn in various patterns, although imposter image 104 could have colors. Imposter image 104, in this example, is a rectangle at the same aspect ratio as image 102. Even if no rendered version of image 102 is available, it may be possible to ascertain the aspect ratio of image 102 (or, more generally, image 102's shape), since the aspect ratio or shape can be determined from image 102's metadata. In fact, even if image 102 is not readily available, its metadata may be available in a separate location. Thus, in order to make it appear as if imposter image 104 is actually an early stage of drawing image 102, imposter image 104 may be rendered at the aspect ratio of image 102, and at the size at which image 102 is to be drawn. In the case where image 102 is non-rectangular, the metadata might reveal the shape of the image, in which case imposter image 104 could be drawn in the shape of image 102. (In general, an aspect ratio is a specific type of description of a shape, which applies to rectangular shapes.) In extreme cases, it might not even be possible to obtain the metadata of image 102. In that case, imposter image 104 could be drawn at some arbitrary aspect ratio (or in some other shape). It is noted that some systems, while rendering an image, provide some type of message indicating that there will be a delay in receiving the image (e.g., "Please wait while your image is retrieved"), or provide some sort of symbol that represents the wait or the passage of time (e.g., sands falling through an hourglass, a circle spinning, a clock, etc.). However, an imposter image might not contain such a message or symbol, so that the imposter can implement a different approach: An imposter image might be designed not so much to explain or acknowledge the delay, but rather to make the user feel as if he or she has started to receive the image.

After imposter image 104 is drawn, the user may be satisfied that the system is working on drawing the requested image. Thus, the processes of obtaining the image, determining the resolution(s) at which to render the image, and rendering the image at that those resolution(s), may be performed. Examples of how these processes are performed are discussed below in connection with FIGS. 4-6. However, for the purpose of FIGS. 1 and 2, it will be assumed that one or more rendered images are obtained in some manner.

The first one of those images is rendering 106. Rendering 106 is a rendering of image 102 at a low resolution. For the purpose of illustration, the low-resolution nature of the image is represented in FIG. 1 by having various elements of the image appear in dotted lines, although in reality a low-resolution image is one in which the image is represented by only a relatively small number of pixels. In FIG. 2, rendering 108 represents image 102 at an even greater resolution (as indicated by dotted lines that appear at greater density than the dotted lines of image 106). Successively higher-resolution versions of image 102 may be drawn. Eventually, the succession of renderings may appear like rendering 110, which appears to be a relatively high resolution of image 102 (e.g., one with a resolution as high as the display device on which the rendering is to be shown). It is noted that the progression of renderings in FIGS. 1 and 2, from imposter image 104, to renderings 106, 108, and 110, is an example of animating the process of bringing an image into higher resolution and/or greater clarity.

Figure 3:
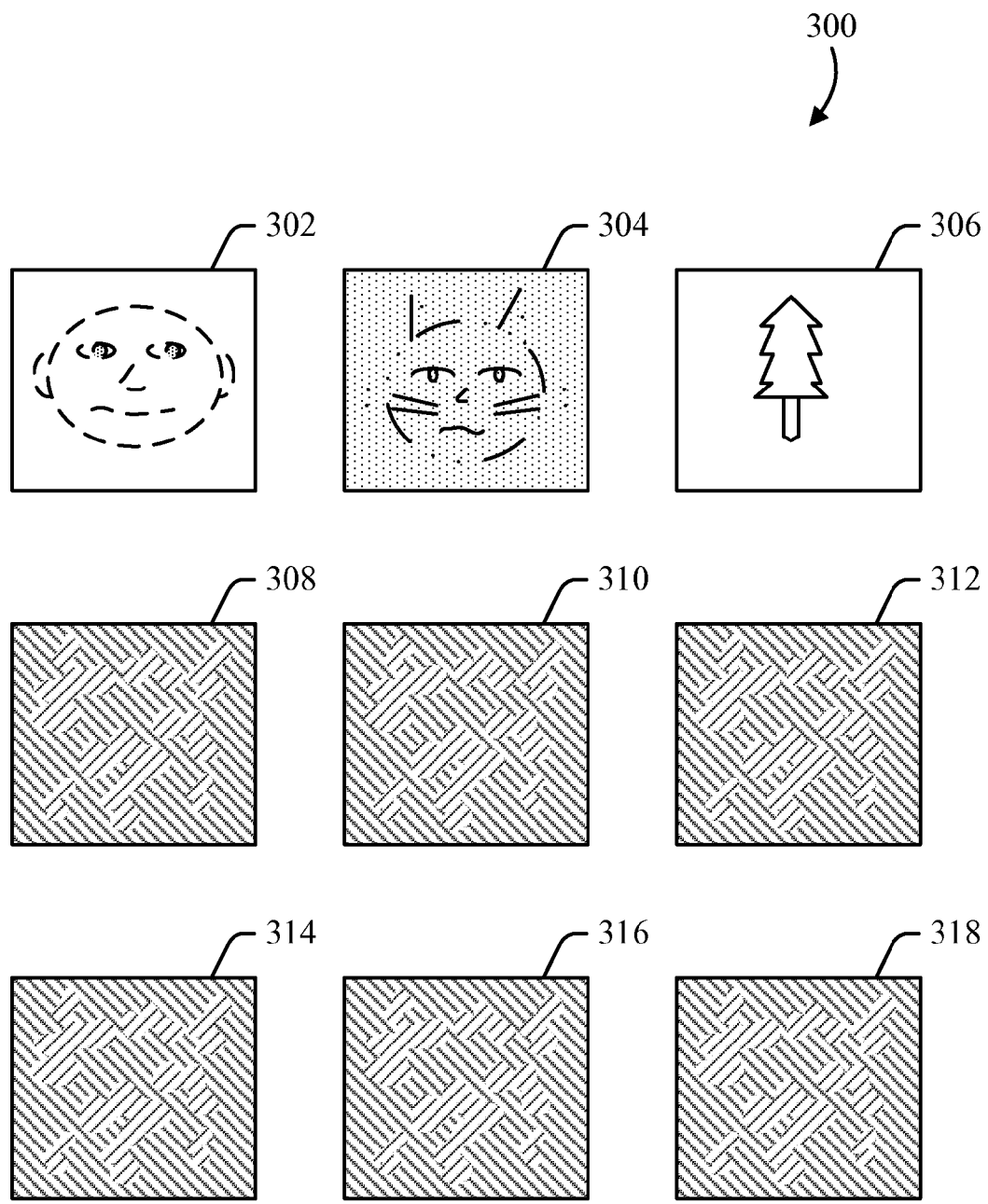
FIG. 3 is a block diagram of an example image collection.

While FIGS. 1 and 2 show a single image as it proceeds from an imposter to a high resolution image, it is noted that images to be rendered may be part of a collection, such as collection 300 shown in FIG. 3. Collection 300 is a collection of several images which, in the example of FIG. 3, contains nine renderings 302, 304, 306, 308, 310, 312, 314, 316, and 318. As can be seen, the various images in collection 300 are at different stages of rendering and/or availability. For example, rendering 302 is shown at a medium resolution. Rendering 304 (of a different image) is shown at a low resolution. Rendering 306 (which is of yet a different image) is shown at a high resolution. Renderings 308-318 are shown as imposter images, indicating that no renderings of the corresponding images are yet available. The collection 300 could be displayed in a variety of ways. In one example, all images in the collection (or imposters, if the images are not available) are rendered onto a single bitmap, and the bitmap may be displayed. For example, a web server could compose a single page that contains a collection of images, and could then send a bitmap of that page to a user's machine to be rendered by the user's browser. As additional images (or higher resolution versions of existing images) become available, the bitmap could be updated and resent to the browser in order to replace the bitmap that is currently being shown by the browser. Or, as another example, each image in the collection could be rendered separately. For example, a web page could contain links to images, so the browser obtains the images one-by-one from their respective Uniform Resource Locators (URLs) and displays each image in the appropriate place on the page. When the link to the images is requested, the server could provide an imposter image, a low resolution image, or a high resolution image depending on what rendered image is available. The individual images could be updated with higher resolution images as such images become available.

Figure 4:
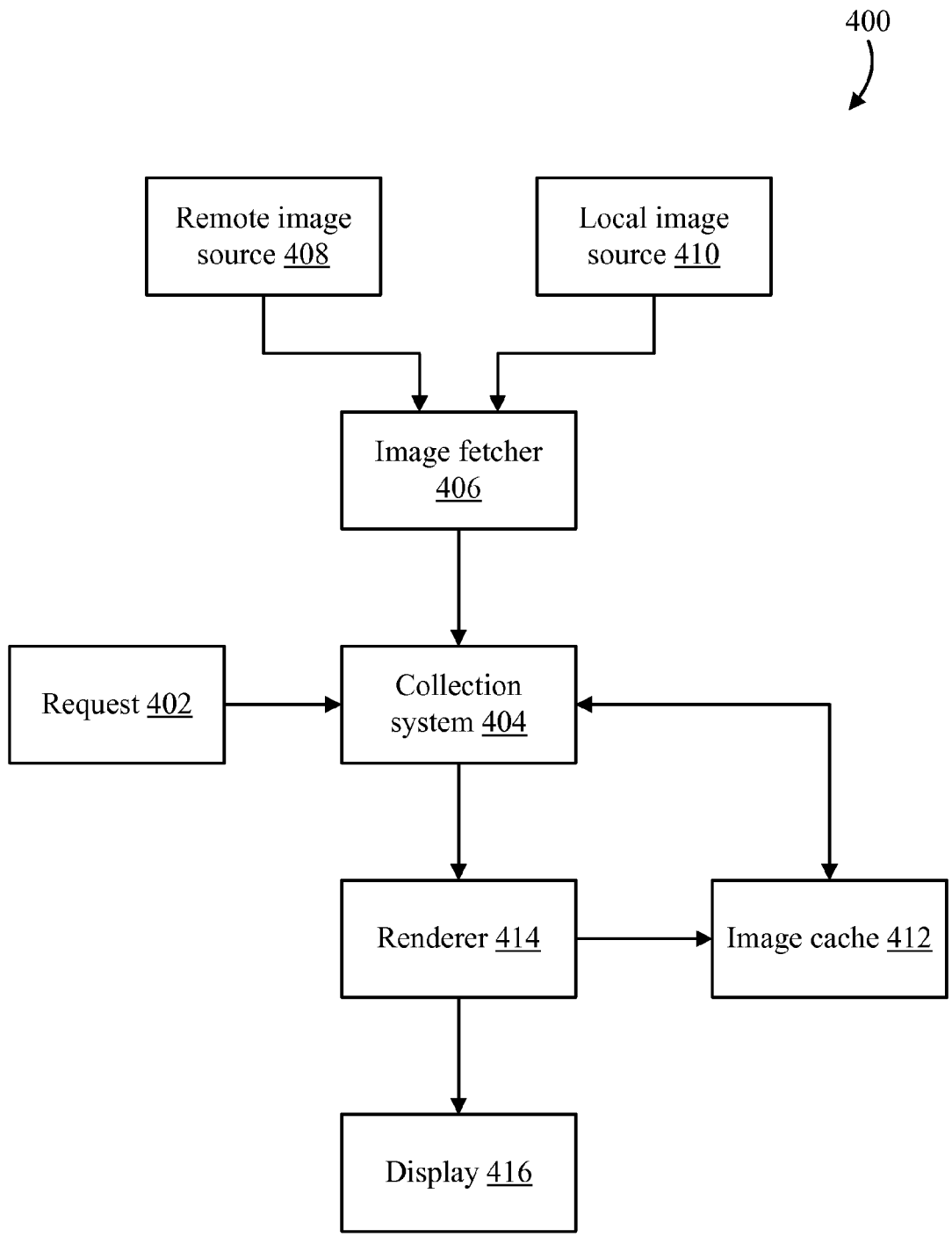
FIG. 4 is a block diagram of example components that may be used to render content.

FIG. 4 shows components of an example system 400 that may be used to render content. System 400 processes a request 402 for one or more images, and manages the process of obtaining and rendering the images.

Request 402 may be received by a collection system. Collection system 404 manages the process of fetching images, and also may manage the process of compositing plural images into a single image (as in the case where a collection is to be displayed).

Regarding collection system 404's role in managing the image fetching process, when collection system 404 determines what images are to be provided, collection system 404 may call upon image fetcher 406 to obtain those images. Image fetcher 406 may obtain images from various sources, including remote image source 408 and/or local image source 410. Remote image source 408 is a source that is located somewhere other than the machine at which image fetcher 406 is operating. Local image source 410 is a source that is located on the machine at which image fetcher 406 is operating. It is noted that there are various scenarios as to what constitutes "the machine on which image fetcher 406 is operating." In one example, image fetcher 406 is operating on the same machine on which images are to be displayed (e.g., a user's computer, a user's smart phone, etc.), in which case local image source 410 may be a storage area on that computer, smart phone, etc. In another example, image fetcher 406 is operating on a server that is rendering images that will not be displayed on that server, but rather will be delivered remotely to a browser on a user's machine in order to be displayed on that user's machine. In that latter example, local source 410 is a source that is on the server that is rendering the images, rather than a source located on the machine at which the images are to be displayed.

In addition to retrieving images from local and remote sources, collection system 404 may also retrieve pre-rendered images from an image cache 412. A distinction between local and remote image sources 408 and 410, and image cache 412, is that image cache 412 stores rendered versions of images, while local and remote image source 408 and 410 may store representations of images that have yet to be rendered. Since the same image may be requested more than once, image cache 412 stores images that may have been rendered as part of servicing some prior request. Thus, image cache 412 allows those images to be used again, thereby avoiding the work of rendering an image if that work already has been done.

System 400 may also comprise renderer 414, which may perform the actual work of rendering an image. That is, when a source image has been retrieved, renderer 414 may use the source image to create the actual pixels that will be displayed. When renderer 414 has rendered an image, that image may be transmitted to display 416. Additionally, when the image has been rendered, renderer 414 may deposit the image in image cache 412, so that the now-rendered image will be available for future use if the same image is later requested again.

It is noted that the process of fetching image may take place in parallel, using plural threads. For example, if a collection contains, say, twenty images, then collection system 404 may create twenty separate threads on which image fetcher 406 operates, so that the images may be retrieved concurrently.

Figure 5:
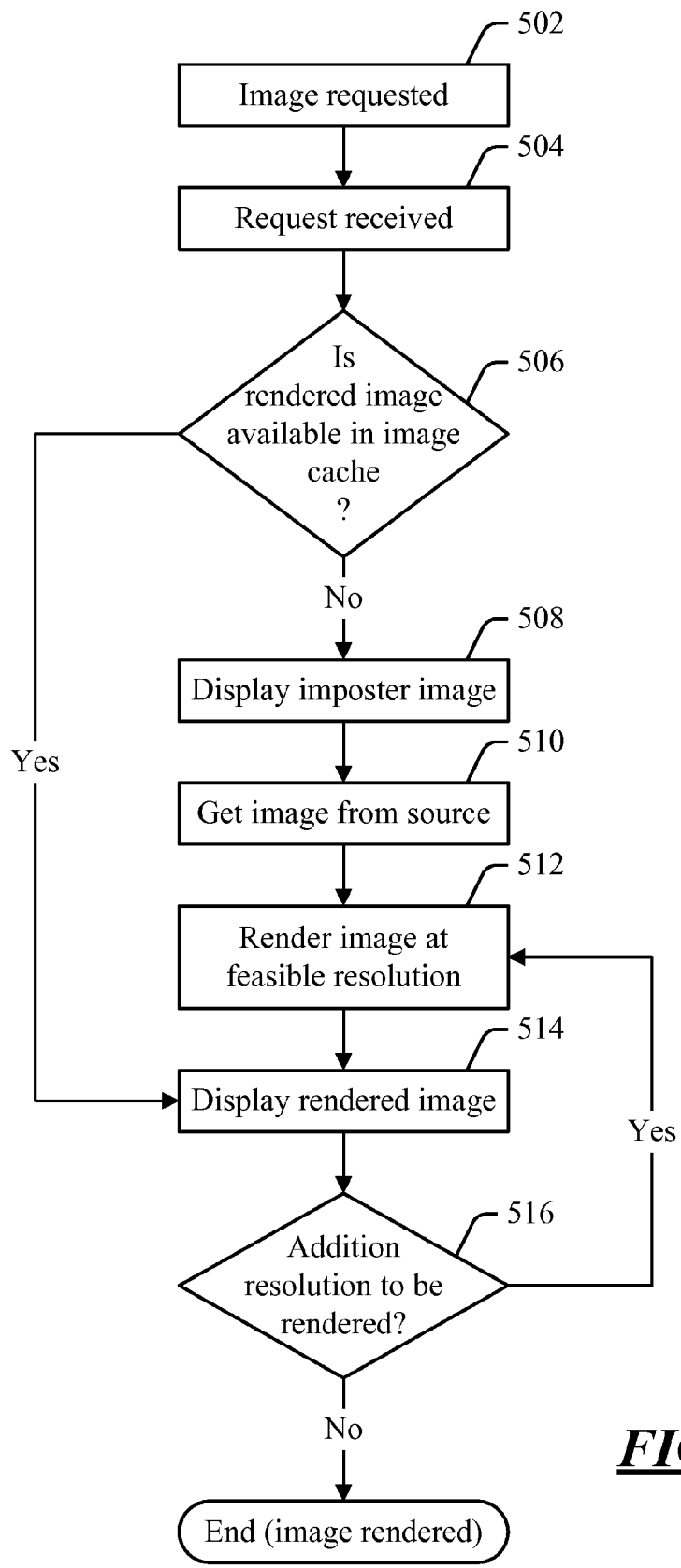
FIG. 5 is a flow diagram of an example process of providing an image.

FIG. 5 shows an example process of providing an image. Before turning to a description of FIG. 5, it is noted that the flow diagram contained in FIG. 5 is described, by way of example, with reference to components shown in FIGS. 1-4, although this process may be carried out in any system and is not limited to the scenarios shown in FIGS. 1-4. Additionally, the flow diagram in FIG. 5 shows an example in which stages of a process are carried out in a particular order, as indicated by the lines connecting the blocks, but the various stages shown in this diagram can be performed in any order, or in any combination or sub-combination.

At 502, an image may be requested. As noted above, the request may arise in any manner: e.g., through a direct user request, through a search engine in which the engine requests the image because the image is responsive to a search, etc. At 504, the request may be received by the component that will process the request. At 506, it may be determined whether a pre-rendered version of the image is available in an image cache. If the image is available (and/or if the image is found to be available in the cache at an appropriate resolution), then the rendered image may be displayed at 514. Otherwise, the process proceeds without a rendered image.

In order to proceed without a rendered image, an imposter image may be displayed at 508. As discussed above, an imposter image may be an image that contains colors and/or patterns that are not derived from the underlying image, but rather may give a user the impression that the imposter is a very early stage of rendering the image at successively higher resolutions. In one example, the imposter image may be drawn at the aspect ratio and/or shape of the underlying image, and at the size at which the actual image eventually will be rendered. However, the subject matter herein also includes situations in which the imposter image is based on no information at all about the underlying image (not even its aspect ratio and/or shape).

When the imposter image has been displayed, the process may proceed to obtain the image from a source at 510. For example, as described above in connection with FIG. 4, an image fetcher 406 may be used to obtain images from remote image source 408 and/or local image source 410. As also noted above, there may be several images to be rendered as part of a collection, and thus the process of obtaining these images may proceed in parallel—e.g., by running an image fetcher on several concurrent threads. Moreover, it is noted that some images in a collect may be available, while others may not be. Thus, in the process of FIG. 5, it is possible that some images in a collection will initially be displayed as imposters, while others are initially displayed as renderings of the underlying image.

Figure 6:
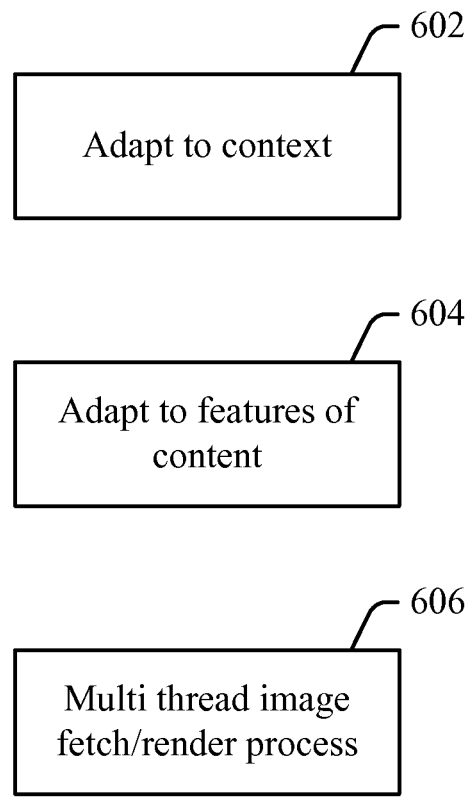
FIG. 6 is a block diagram of some example adaptations that may be performed by the subject matter herein.

Once the image has been retrieved, at 512 the image may be rendered at a feasible resolution. What constitutes feasibility may depend on the relevant circumstances. The various ways in which the system may assess feasibility illustrate the adaptive nature of the subject matter described herein. For example, as noted above, there may be issues concerning the speed at which images can be rendered, the speed at which images can be drawn, the speed at which images can be transmitted from their rendering location to their display location, or other considerations. Some of these considerations are shown in FIG. 6, which are now described.

In general, one type of adaptation is to adapt to the context in which the image display is being performed (block 602). Examples of this context include the number of images that are being rendered (e.g., a single image or a collection of images), the available transmission bandwidth, the drawing speed of the display system. These issues may define what constitutes a feasible resolution at which to render an image. For example, as noted above, one might want to animate the process of an image coming into higher and higher resolution by doubling the resolution at each successive drawing of the image. However, if there is not sufficient transmission bandwidth or drawing speed, or sufficient rendering bandwidth, then it may take too long to animate the increased resolution of the image when successive images merely double in resolution. Thus, a choice may be made to quadruple the resolution between successive images.

Another type of adaptation is adaptation to the features of the content (block 604). For example, as noted above, certain kinds of content may make it easier to render at some resolutions than at others—e.g., the nature of JPEG may make it easier to render at 256 or 512 pixels than at other resolutions. Thus, the ease of rendering content at particular resolutions (and/or other features of the content) may inform the choice of the resolution at which to render the content. It is noted that, when choosing resolution(s) at which to rendering an image, a system might choose a particular resolution (e.g., resolution A) if there were no concern about which resolutions could be drawn quickly. However, the existence of a fast path to a particular resolution might cause the system to choose a distinct resolution (e.g., resolution B), which is not the resolution that the system would otherwise have chosen. In other words, in such an example, the system chooses resolution B not because it is the resolution that the system would have chosen based on the appearance that the system is trying to achieve; rather the system might choose resolution B, as opposed to resolution A, specifically due to availability of the fast path.

Another form of adaptation is the ability to multi-thread the image fetch and/or render process (block 606). As noted above, images may be part of a collection, and it may be possible to retrieve the various images in the collection concurrently. Similarly, as to images that have been retrieved, it may also be possible to multi-thread the rendering process, thereby allowing retrieved images to be rendered concurrently.

Returning to FIG. 5, once the image has been rendered (either because a rendered image was already available, as determined at 506, or because the image was retrieved and rendered after the image was requested), the rendered image may be displayed at 514. The act of displaying the image may include the physical display of the image on a screen or other device. Or, the act of displaying the image may include directing that the display of the image is to occur on another device. (E.g., if a server sends a client instructions to display an image, this act may be understood as an act of displaying that is performed by the server).

At 516, it may be determined whether there are additional resolutions to be rendered. As noted above, one may want to animate the process of displaying an image at increasingly high resolutions, and thus several renderings of the same image may be performed. The specific resolutions that might be chosen for this animation process may be determined based on the feasibility considerations discussed above. However, assuming that the choice of what resolutions to render has been made in some manner (where this choice itself may change while the rendering and fetching processes are ongoing), it is determined at 516 whether there are additional resolutions of the image(s) to render. If there are such additional resolutions, then the process may return to 512 to render the image at the additional resolution(s). Otherwise, the image has been rendered at its terminal resolution, and the process may end.

Figure 7:
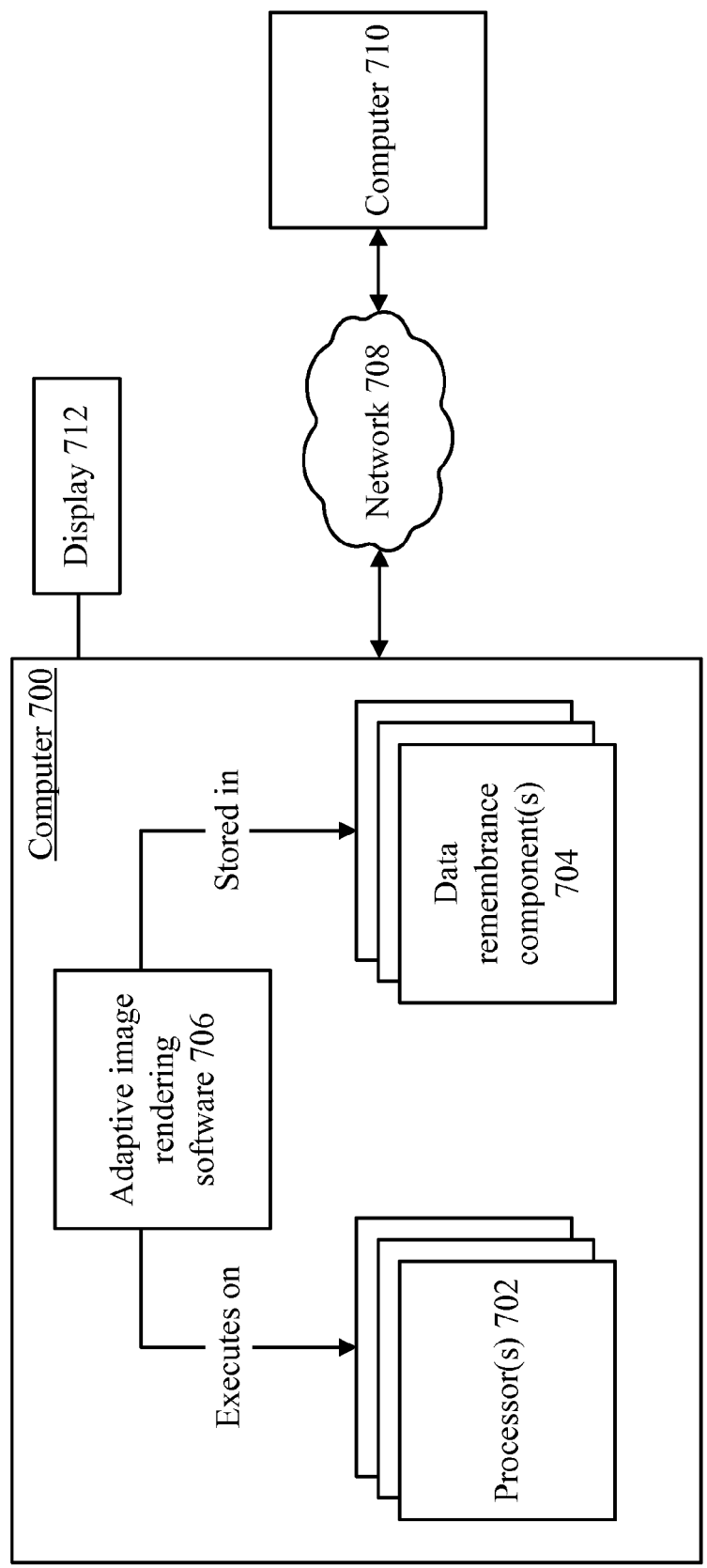
FIG. 7 is a block diagram of example components that may be used in connection with implementations of the subject matter described herein.

FIG. 7 shows an example environment in which aspects of the subject matter described herein may be deployed.

Computer 700 includes one or more processors 702 and one or more data remembrance components 704. Processor(s) 702 are typically microprocessors, such as those found in a personal desktop or laptop computer, a server, a handheld computer, or another kind of computing device. Data remembrance component(s) 704 are components that are capable of storing data for either the short or long term. Examples of data remembrance component(s) 704 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 700 may comprise, or be associated with, display 712, which may be a cathode ray tube (CRT) monitor, a liquid crystal display (LCD) monitor, or any other type of monitor.

Software may be stored in the data remembrance component(s) 704, and may execute on the one or more processor(s) 702. An example of such software is adaptive image rendering software 706, which may implement some or all of the functionality described above in connection with FIGS. 1-6, although any type of software could be used. Software 706 may be implemented, for example, through one or more components, which may be components in a distributed system, separate files, separate functions, separate objects, separate lines of code, etc. A computer (e.g., personal computer, server computer, handheld computer, smart phone, etc.) in which a program is stored on hard disk, loaded into RAM, and executed on the computer's processor(s) typifies the scenario depicted in FIG. 7, although the subject matter described herein is not limited to this example.

The subject matter described herein can be implemented as software that is stored in one or more of the data remembrance component(s) 704 and that executes on one or more of the processor(s) 702. As another example, the subject matter can be implemented as instructions that are stored on one or more computer-readable storage media. Tangible media, such as an optical disks or magnetic disks, are examples of storage media. The instructions may exist on non-transitory media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium.

Additionally, any acts described herein (whether or not shown in a diagram) may be performed by a processor (e.g., one or more of processors 702) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 700 may be communicatively connected to one or more other devices through network 708. Computer 710, which may be similar in structure to computer 700, is an example of a device that can be connected to computer 700, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable storage devices that store executable instructions to display an image, wherein the executable instructions, when executed by a computer, cause the computer to perform acts comprising:
  receiving a request for said image;
  determining that a rendered version of said image is not available in an image cache;

providing an imposter image that comprises colors or patterns that are not based on content of said image;
retrieving said image from an image source;
determining a resolution at which to render said image by performing acts comprising:
choosing said resolution based on a format of said image;
rendering said image at said resolution to create a rendered image; and
providing said rendered image in place of said imposter image, said format providing a fast path to render said image at said resolution, said act of determining said resolution choosing said resolution, as opposed to other resolutions, due to existence of said fast path.

2. The one or more computer-readable storage devices of claim 1, wherein said image has a shape, and wherein said providing of said imposter image comprises:
creating said imposter image in said shape and at a size at which said image is to be rendered, wherein said imposter image does not comprise a message indicating that there will be a delay in receiving said image, and that does not comprise a symbol indicating a wait for said image or passage of time.

3. The one or more computer-readable storage devices of claim 2, wherein said shape comprises a rectangle, and wherein said creating of said imposter image in said shape comprises:
creating said imposter image in a rectangular shape at an aspect ratio of said rectangle.

4. The one or more computer-readable storage devices of claim 1, wherein said determining of said resolution at which to render said image comprises:
choosing said resolution further based on a transmission bandwidth available to transmit said rendered image, or based on a drawing speed of a device on which said image is to be drawn.

5. A method of rendering an image, wherein the method comprises:
using a processor to perform acts comprising:
receiving a request to render an image;
providing a rendered version of said image, or an imposter image, as part of a collection of images that includes said image;
determining a plurality of resolutions at which to render said image to animate a process of showing said image at increasingly high resolutions, wherein said plurality of resolutions are determined based on transmission bandwidth, drawing speed, or image format;
rendering said image at said plurality of resolutions to create a plurality of rendered images; and
providing said plurality of rendered images at said plurality of resolutions,
said plurality of resolutions being determined based on a format in which said image is stored, said format providing a fast path to render said image at a first resolution, said determining act choosing, based on available transmission bandwidth or drawing speed, a second resolution that is distinct from said first resolution and then determining to render said image at said first resolution instead of said second resolution due to availability of said fast path.

6. The method of claim 5, wherein said image has a shape, wherein said acts further comprise:
retrieving data comprising said shape; and
creating said imposter image in said shape.

7. The method of claim 5, wherein said plurality of resolutions are further determined based on an amount of transmission bandwidth that is available to transmit said image.

8. The method of claim 5, wherein said plurality of resolutions are further determined based on a drawing speed of a device on which said image is to be displayed.

9. The method of claim 5, wherein said acts further comprise:
concurrently fetching images in said collection using separate fetch threads.

10. A system for rendering an image, the system comprising:
a processor;
a data remembrance component;
an image cache that is stored in said data remembrance component;
an image fetcher that retrieves images from sources that are local to said system and from sources that are remote to said system;
a collection component that executes on said processor, wherein said collection component receives a request to render an image and determines whether a rendered version of said image is available in said image cache, wherein said collection component directs said image fetcher to retrieve said image, wherein said system directs that an imposter image be displayed when said rendered version of said image is not in said image cache; and
a renderer that renders said image retrieved by said image fetcher, and that causes said image either to be displayed by said system, or to be provided to a device on which said image is to be displayed, said system animating an increase in resolution of said image and choosing resolutions at which to render said image based on a format of said image, said format providing a path to render said image at a first resolution that is faster than a path to render said image at a second resolution that is distinct from said first resolution, and said system choosing said first resolution instead of said second resolution due to existence of said path.

11. The system of claim 10, wherein said collection component directs that said imposter image be displayed, wherein said image has a shape, and wherein said system creates said imposter image in said shape.

12. The system of claim 11, wherein said shape comprises a rectangle, and wherein said imposter image is created in a rectangular shape having an aspect ratio of said rectangle.

13. The system of claim 10, wherein said system animates an increase in resolution of said image and chooses resolutions at which to render said image further based on an amount of bandwidth available to transmit said image.

14. The system of claim 10, wherein said system animates an increase in resolution of said image and chooses resolutions at which to render said image further based on a drawing speed of said device.

* * * * *